(12) United States Patent
Habibian et al.

(10) Patent No.: US 11,991,368 B2
(45) Date of Patent: May 21, 2024

(54) VIDEO COMPRESSION USING DEEP GENERATIVE MODELS

(71) Applicant: Qualcomm Incorporated, San Diego, CA (US)

(72) Inventors: Amirhossein Habibian, Amsterdam (NL); Taco Sebastiaan Cohen, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/862,291

(22) Filed: Jul. 11, 2022

(65) Prior Publication Data
US 2022/0360794 A1    Nov. 10, 2022

Related U.S. Application Data

(63) Continuation of application No. 16/360,458, filed on Mar. 21, 2019, now Pat. No. 11,388,416.

(51) Int. Cl.
*H04N 19/149* (2014.01)
*G06N 3/04* (2023.01)
(Continued)

(52) U.S. Cl.
CPC ........... *H04N 19/149* (2014.11); *G06N 3/045* (2023.01); *G06N 3/084* (2013.01); *G06N 20/20* (2019.01);
(Continued)

(58) Field of Classification Search
CPC .. H04N 19/149; H04N 19/117; H04N 19/172; H04N 19/31; G06N 20/20; G06N 3/0454; G06N 3/084
See application file for complete search history.

(56) References Cited

U.S. PATENT DOCUMENTS 10,223,616 B1 *   3/2019   Malin ............... G06F 18/24143
10,440,431 B1 * 10/2019   Bulusu ............... H04N 21/4532
(Continued)

FOREIGN PATENT DOCUMENTS

| CN | 104428833 A | 3/2015 |
| EP | 3624452 A1 | 3/2020 |
| WO | 2019009489 A1 | 1/2019 |

OTHER PUBLICATIONS

Dandan D., et al., "Deep Neural Network Based Frame Reconstruction for Optimized Video Coding", Jun. 21, 2018 (Jun. 21, 2018), Robocup 2008, Robocup 2008: Robot Soccer World Cup XII; [Lecture Notes In Computer Science;Lect. Notes Computer], Springer International Publishing, Cham, pp. 235-242, XP047494584, ISBN: 978-3-319-10403-4, [retrieved on Jun. 21, 2018], abstract, section 3.
(Continued)

*Primary Examiner* — Zaihan Jiang
(74) *Attorney, Agent, or Firm* — Patterson + Sheridan, LLP

(57) ABSTRACT

Certain aspects of the present disclosure are directed to methods and apparatus for compressing video content using deep generative models. One example method generally includes receiving video content for compression. The received video content is generally encoded into a latent code space through an auto-encoder, which may be implemented by a first artificial neural network. A compressed version of the encoded video content is generally generated through a trained probabilistic model, which may be implemented by a second artificial neural network, and output for transmission.

30 Claims, 8 Drawing Sheets

(51) Int. Cl.
  *G06N 3/045*   (2023.01)
  *G06N 3/08*    (2023.01)
  *G06N 3/084*   (2023.01)
  *G06N 20/20*   (2019.01)
  *H04N 19/117*  (2014.01)
  *H04N 19/172*  (2014.01)
  *H04N 19/31*   (2014.01)

(52) U.S. Cl.
  CPC ......... *H04N 19/117* (2014.11); *H04N 19/172* (2014.11); *H04N 19/31* (2014.11)

(56) References Cited

U.S. PATENT DOCUMENTS

| | | | |
|---|---|---|---|
| 11,388,416 B2 | 7/2022 | Habibian et al. | |
| 2015/0278350 A1* | 10/2015 | Nice | G06Q 30/0631 |
| | | | 707/754 |
| 2015/0278606 A1* | 10/2015 | Laksono | H04N 21/8153 |
| | | | 382/103 |
| 2016/0227228 A1* | 8/2016 | Pomeroy | H04N 19/46 |
| 2017/0124727 A1* | 5/2017 | Amat Roldan | G01B 11/14 |
| 2017/0200066 A1* | 7/2017 | Wang | G06N 3/045 |
| 2018/0173994 A1* | 6/2018 | Rippel | G06N 3/08 |
| 2018/0199066 A1 | 7/2018 | Ross | |
| 2018/0218256 A1 | 8/2018 | Raviv et al. | |
| 2018/0247201 A1* | 8/2018 | Liu | G06T 1/00 |
| 2018/0268571 A1 | 9/2018 | Park et al. | |
| 2019/0026586 A1* | 1/2019 | Liu | G06V 10/17 |
| 2019/0297328 A1* | 9/2019 | Nowozin | H04N 19/97 |
| 2019/0311513 A1* | 10/2019 | Han | H04L 67/131 |
| 2020/0026951 A1* | 1/2020 | Chowdhury | G06F 18/217 |
| 2020/0027247 A1* | 1/2020 | Minnen | G06T 9/002 |
| 2020/0034627 A1* | 1/2020 | Zhu | G06V 10/454 |
| 2020/0034654 A1* | 1/2020 | Mansi | G06N 3/084 |
| 2020/0090069 A1* | 3/2020 | Mandt | H04N 19/503 |
| 2020/0304802 A1 | 9/2020 | Habibian et al. | |
| 2021/0004677 A1* | 1/2021 | Menick | G06N 20/20 |

OTHER PUBLICATIONS

International Preliminary Report on Patentability—PCT/US2020/023645 The International Bureau of WIPO—Geneva, Switzerland, Sep. 30, 2021.

International Search Report and Written Opinion—PCT/US2020/023645—ISA/EPO—dated Jun. 18, 2020.

Minnen D., et al., "Joint Autoregressive and Hierarchical Priors for Learned Image Compression", Arxiv.org, Cornell University Library, 201 Olin Library Cornell University Ithaca, NY 14853, Sep. 8, 2018 (Sep. 8, 2018), XP081188741, 22 pages, abstract, figure 1, figures 17, 18, 19, 21, sections 1 and 2, section 4.

* cited by examiner

VIDEO COMPRESSION USING DEEP GENERATIVE MODELS

This application is a continuation of U.S. patent application Ser. No. 16/360,458, entitled "VIDEO COMPRESSION USING DEEP GENERATIVE MODELS," filed Mar. 21, 2019, which is hereby expressly incorporated by reference herein in its entirety.

FIELD OF THE DISCLOSURE

The present disclosure generally relates to artificial neural networks and, more particularly, to using artificial neural networks to compress video content.

DESCRIPTION OF RELATED ART

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks exist, such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each have a receptive field (e.g., a spatially localized region of an input space) and that collectively tile an input space. Convolutional neural networks have numerous applications. In particular, CNNs have broadly been used in the area of pattern recognition and classification.

In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

SUMMARY

Certain aspects of the present disclosure are directed to a method for compressing video. The method generally includes receiving video content for compression, encoding the received video content into a latent code space through an auto-encoder implemented by a first artificial neural network, generating a compressed version of the encoded video content through a probabilistic model implemented by a second artificial neural network, and outputting the compressed version of the encoded video content for transmission.

Certain aspects of the present disclosure are directed to a system for compressing video. The system includes at least one processor and a memory coupled to the at least one processor. The at least one processor is generally configured to receive video content for compression, encode the received video content into a latent code space through an auto-encoder implemented by a first artificial neural network configured to execute on the at least one processor, generate a compressed version of the encoded video content through a probabilistic model implemented by a second artificial neural network configured to execute on the at least one processor, and output the compressed version of the encoded video content for transmission.

Certain aspects of the present disclosure are directed to a non-transitory computer-readable medium comprising instructions that, when executed by at least one processor, cause the processor to perform operations for compressing video. The operations generally include receiving video content for compression, encoding the received video content into a latent code space through an auto-encoder implemented by a first artificial neural network, generating a compressed version of the encoded video content through a probabilistic model implemented by a second artificial neural network, and outputting the compressed version of the encoded video content for transmission.

Certain aspects of the present disclosure are directed to a method for decompressing encoded video. The method generally includes receiving a compressed version of an encoded video content, decompressing the compressed version of the encoded video content into a latent code space based on a probabilistic model implemented by a first artificial neural network, decoding the encoded video content out of the latent code space through an auto-encoder implemented by a second artificial neural network, and outputting the decoded video content for display.

Certain aspects of the present disclosure are directed to a system for decompressing encoded video. The system includes at least one processor and a memory coupled to the at least one processor. The at least one processor is generally configured to receive a compressed version of an encoded video content, decompress the compressed version of the encoded video content into a latent code space based on a probabilistic model implemented by a first artificial neural network configured to execute on the at least one processor, decode the encoded video content out of the latent code space through an auto-encoder implemented by a second artificial neural network configured to execute on the at least one processor, and output the decoded video content for display.

Certain aspects of the present disclosure are directed to a non-transitory computer-readable medium comprising instructions that, when executed by at least one processor, cause the processor to perform operations for decompressing encoded video. The operations generally include receiving a compressed version of an encoded video content; decompressing the compressed version of the encoded video content into a latent code space based on a probabilistic model implemented by a first artificial neural network; decoding the encoded video content out of the latent code space through an auto-encoder implemented by a second artificial neural network; and outputting the decoded video content for display.

Other aspects, advantages, and features of the present disclosure will become apparent after review of the entire application, including the following sections: Brief Description of the Drawings, Detailed Description, and the Claims.

DETAILED DESCRIPTION

Certain aspects of the present disclosure provide methods and apparatus for compressing video content using deep generative models and for decompressing received bitstreams into video content.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Example Artificial Neural Networks

Figure 1:
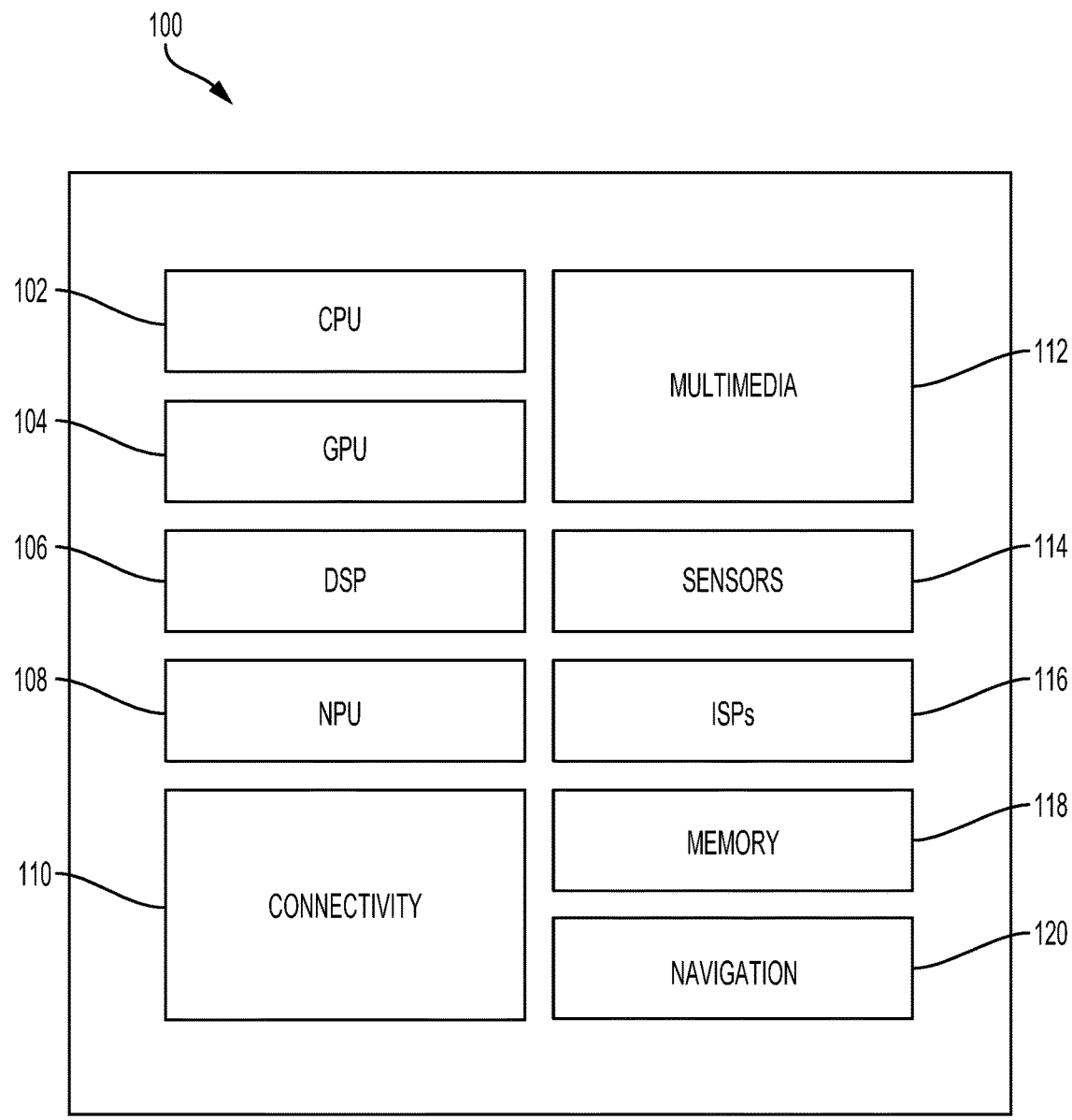
FIG. 1 illustrates an example implementation of a system-on-a-chip (SOC).

FIG. 1 illustrates an example implementation of a system-on-a-chip (SOC) 100, which may include a central processing unit (CPU) 102 or a multi-core CPU configured to perform a parallel Monte Carlo dropout function, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression according to aspects of the present disclosure discussed below. By using deep learning architectures to perform video compression and/or decompression, aspects of the present disclosure may accelerate the compression of video content on a device and transmission of the compressed video to another device and/or may accelerate the decompression of compressed video content received at the device.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of input values (e.g., input vector components) may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
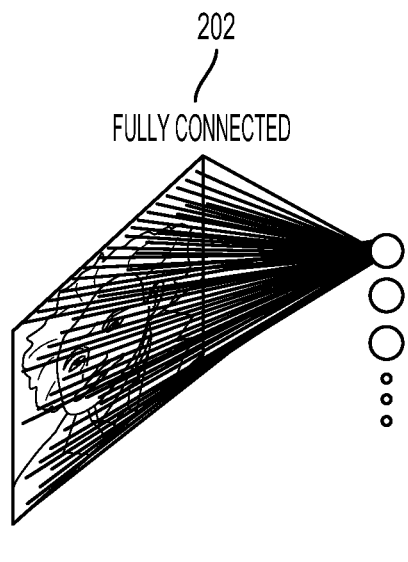
FIG. 2A illustrates an example of a fully connected neural network.
Figure 2B:
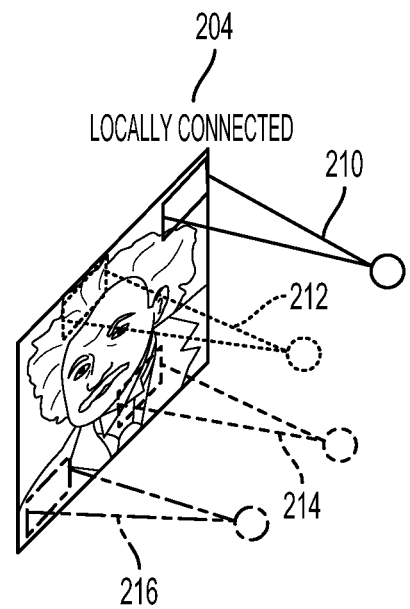
FIG. 2B illustrates an example of a locally connected neural network.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
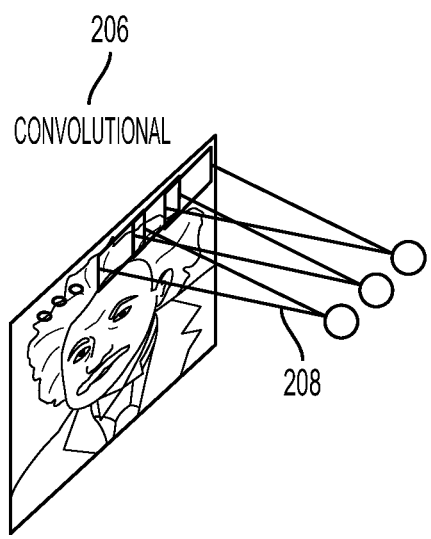
FIG. 2C illustrates an example of a convolutional neural network.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
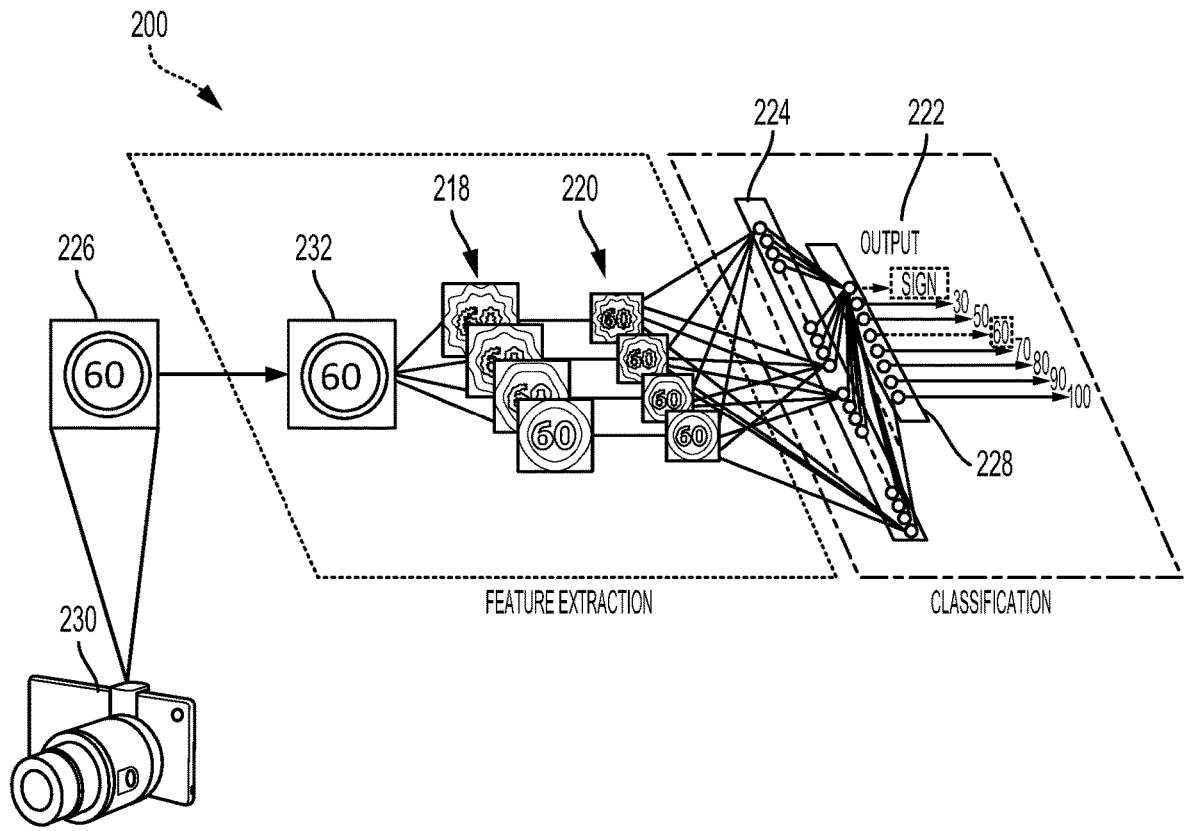
FIG. 2D illustrates a detailed example of a deep convolutional network (DCN) designed to recognize visual features from an image.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
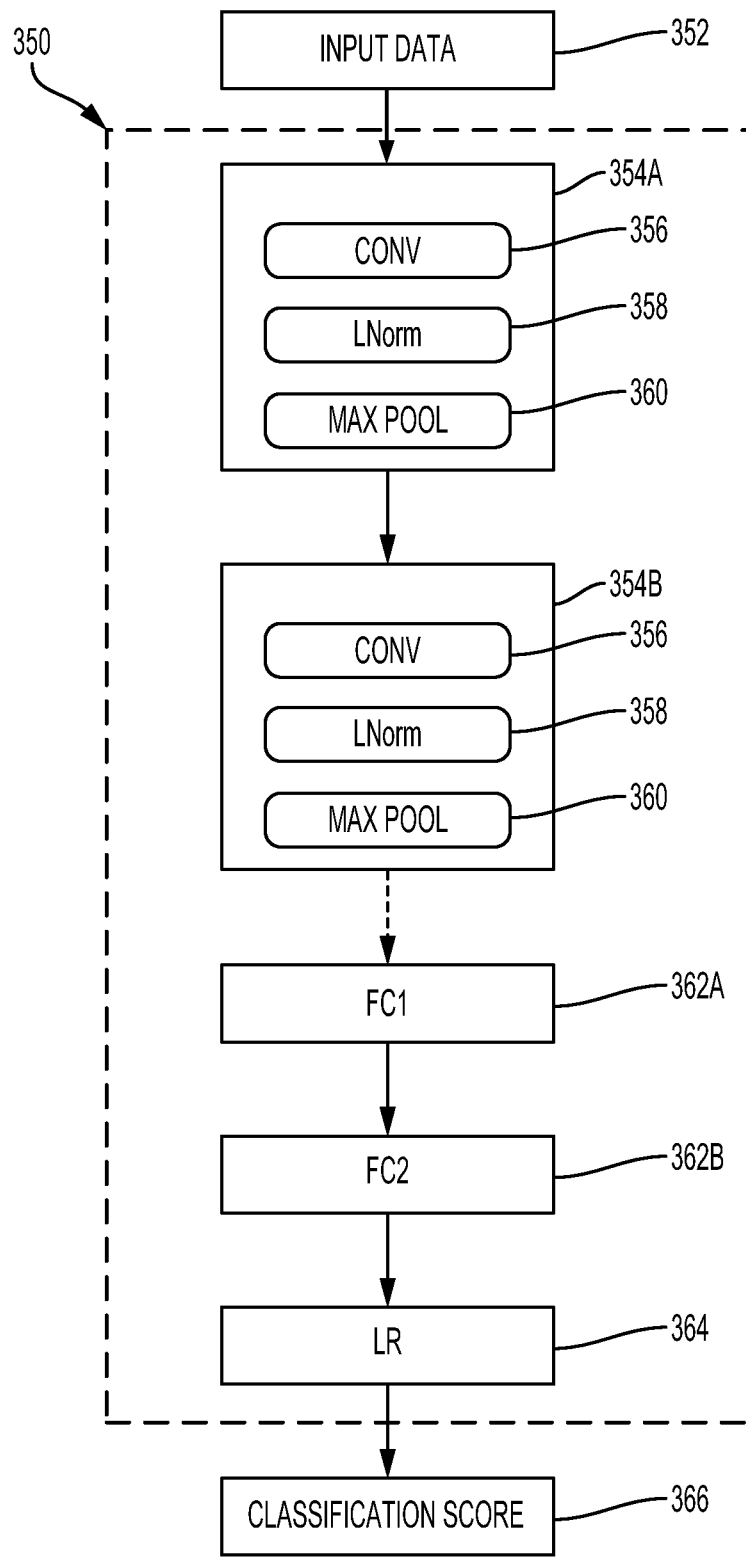
FIG. 3 is a block diagram illustrating a deep convolutional network (DCN).

FIG. 3 is a block diagram illustrating an exemplary deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Example Video Compression Using Deep Generative Models

Video content may be uploaded to video hosting services and sharing platforms and may be transmitted to a variety of devices. Recording uncompressed video content generally results in large file sizes that greatly increase as the resolution of the recorded video content increases. For example, uncompressed 16-bit per channel video recorded in 1080p/24 (e.g. a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Because uncompressed video content may result in large files that may involve sizable memory for physical storage and considerable bandwidth for transmission, techniques may be utilized to compress such video content. For example, consider the delivery of video content over wireless networks. It is projected that video content will comprise the majority of consumer internet traffic, with over half of that video content being delivered to mobile devices over wireless networks (e.g., via LTE, LTE-Advanced, New Radio (NR), or other wireless networks). Despite advances in the amount of available bandwidth in wireless networks, it may still be desirable to reduce the amount of bandwidth used to deliver video content in these networks.

To reduce the size of video content—and thus the amount of storage involved to store video content—and the amount of bandwidth involved in delivering video content, various compression algorithms may be applied to video content. Conventionally, video content may be compressed using a priori defined compression algorithms, such as the Motion Picture Experts Group (MPEG) algorithms, H.264, or the High Efficiency Video Coding algorithm. These a priori defined compression algorithms may be able to retain the majority of the information in raw video content and may be defined a priori based on signal processing and information theory ideas. However, while these predefined compression algorithms may be applicable generally (e.g., to any type of video content), these predefined compression algorithms may not take into account similarities in content, new resolutions or frame rates for video capture and delivery, non-natural imagery (e.g., radar imagery or other imagery captured via various sensors), and the like.

Aspects of the present disclosure provide for the compression and decompression of video content using a deep neural network. The deep neural network may include: (1) an auto-encoder that maps frames of received video content into a latent code space (e.g., a space between an encoder and a decoder of an auto-encoder in which the video content has been encoded into code, which is also referred to as latent variables or latent representations) and (2) a probabilistic model that can losslessly compress codes from the latent code space. The probabilistic model generally generates a probability distribution over a set of codes Z that can represent an encoded video based on the encoded video content. The deep neural network may also include an arithmetic coder that generates a bitstream to be output for transmission based on the probability distribution and the set of codes Z. By compressing (and decompressing) video content using one or more artificial neural networks, aspects of the present disclosure may provide for video encoding and encoding mechanisms that may be adaptable to various use cases by retraining the artificial neural network(s). Further, aspects of the present disclosure may provide for the autonomous generation of video encoders and decoders that generate compressed video content having video bitrate and/or quality approaching or exceeding that of conventional, a priori defined video compression algorithms (e.g., MPEG-4).

Figure 4:
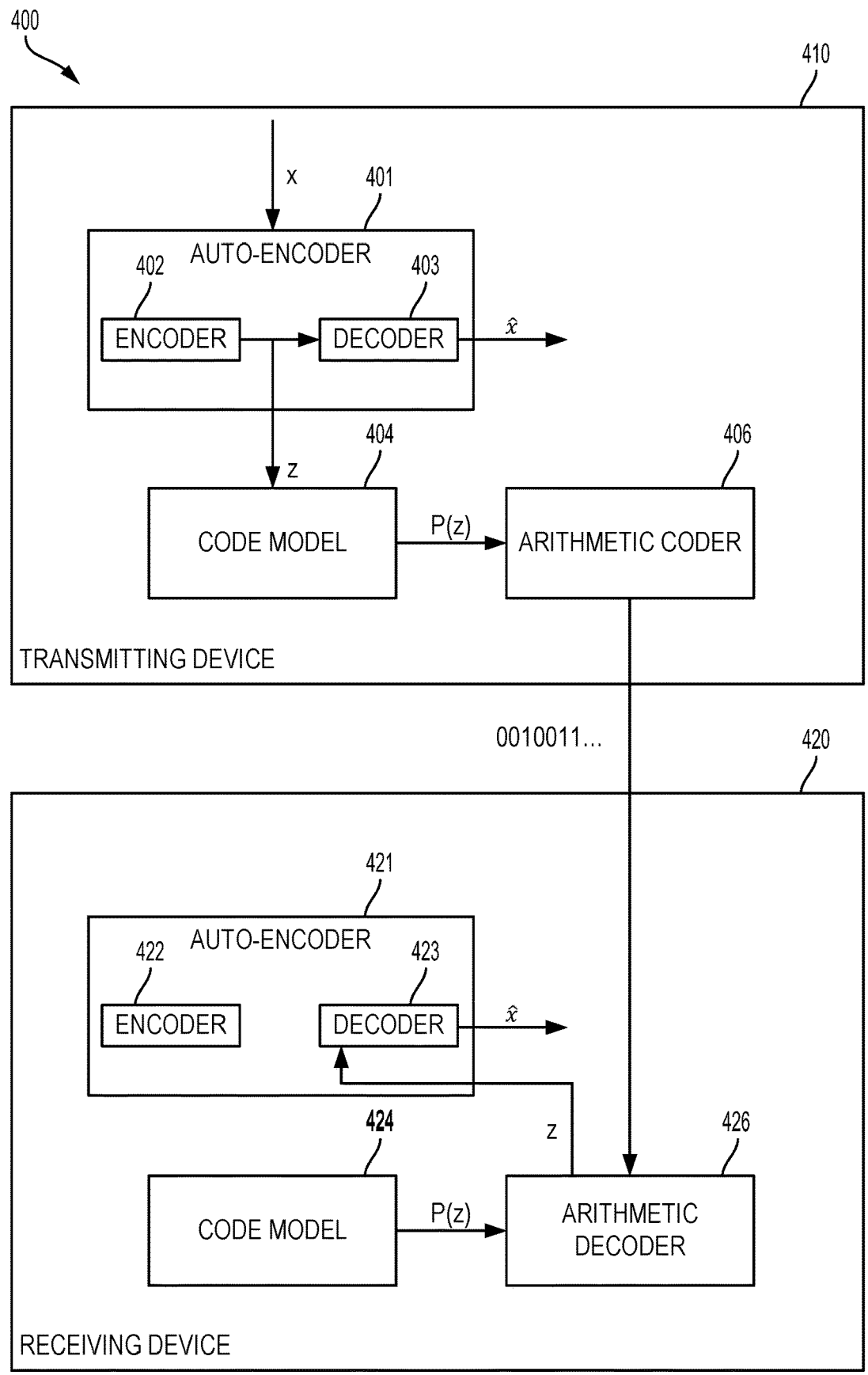
FIG. 4 illustrates an example pipeline for compressing video content and another example pipeline for decompressing a received bitstream into video content, using artificial neural networks, according to aspects of the present disclosure.

FIG. 4 illustrates a system 400 including a transmitting device 410 that compresses video content and transmits the compressed video content to a receiving device 420 for decompression and output on receiving device 420 and/or video output devices connected to receiving device 420. As illustrated, the transmitting device 410 includes a video compression pipeline, and receiving device 420 includes a bitstream decompression pipeline. The video compression pipeline in transmitting device 410 and the bitstream decompression pipeline in receiving device 420 generally use one or more artificial neural networks to compress video content and/or decompress a received bitstream into video content, according to aspects of the present disclosure. As illustrated, the video compression pipeline in the transmitting device 410 includes an auto-encoder 401, a code model 404, and an arithmetic coder 406, and the video decompression pipeline in the receiving device 420 includes an auto-encoder 421, code model 424, and arithmetic decoder 426.

As illustrated, auto-encoder 401 includes an encoder 402 and a decoder 403. Encoder 402 generally performs lossy compression on received uncompressed video content by mapping pixels in multiple frames of the uncompressed video content to a latent code space. Generally, encoder 402 may be configured such that the codes representing an encoded video are discrete or binary. These codes may be generated based on stochastic perturbation techniques, soft vector quantization, or other techniques that can generate distinct codes. In some aspects, auto-encoder 401 may map uncompressed video to codes having a compressible (low entropy) distribution. These codes may be close in cross-entropy to a predefined or learned prior distribution.

Auto-encoder 401 may be implemented using a convolutional architecture. In some aspects, auto-encoder 401 may be configured as a three-dimensional convolutional neural network (CNN) such that auto-encoder 401 learns spatiotemporal filters for mapping video to a latent code space. In such a network, auto-encoder 401 may encode video in terms of a key frame (e.g., an initial frame marking the beginning of a sequence of frames in which subsequent frames in the sequence are described as a difference relative to the initial frame in the sequence), warping (or differences) between the key frame and other frames in the video, and a residual factor. In other aspects, auto-encoder 401 may be implemented as a two-dimensional neural network conditioned on previous frames, a residual factor between frames, and conditioning through stacking channels or including recurrent layers.

In some aspects, auto-encoder 401 may be trained using a set of training videos. Encoder 402 in auto-encoder 401 may take a first training video (designated x) and map the first training video to a code z in a latent code space. As discussed, encoder 402 may be implemented as a three-dimensional convolutional network such that the latent code space has at each (x, y, t) position a vector describing a block of video centered at that position. The x coordinate may represent a horizontal pixel location in the block of video, the y coordinate may represent a vertical pixel location in the block of video, and the t position may represent a timestamp in the block of video. By using the three dimensions of horizontal pixel location, vertical pixel location, and time, the vector may describe an image patch across a plurality of frames. In some aspects, however, auto-encoder 401 may map frames of a video in a two-dimensional space using a two-dimensional convolutional network. A code model used by auto-encoder 401 mapping frames of a video in a two-dimensional space may make use of redundancy between adjacent frames (e.g., same or similar information included in successive frames).

A decoder 403 may then decompress code z to obtain a reconstruction $\hat{x}$ of the first training video. Generally the reconstruction $\hat{x}$ may be an approximation of the uncompressed first training video and need not be an exact copy of the first training video x. Auto-encoder 401 may compare x and $\hat{x}$ to determine a distance vector or other difference value between the first training video and the reconstructed first training video. Based on the determined distance vector or other difference value, auto-encoder 401 may adjust mappings between received video content (e.g., on a per-frame basis) and the latent code space to reduce the distance between an input uncompressed video and an encoded video generated as output by auto-encoder 401. Auto-encoder 401 may repeat this process using, for example, stochastic gradient descent techniques to minimize or otherwise reduce differences between an input video x and a reconstructed video $\hat{x}$ resulting from decoding of a generated code z.

Code model 404 receives the code z representing an encoded video or portion thereof and generates a probability distribution P(z) over a set of compressed codewords that can be used to represent the code z. Code model 404 may comprise a probabilistic auto-regressive generative model, for example. In some aspects, the codes for which a probability distribution may be generated may comprise a learned distribution that controls bit assignment based on an adaptive arithmetic coder 406. For example, using adaptive arithmetic coder, a compression code for a first z may be predicted in isolation; a compression code for a second z may be predicted based on the compression code for the first z; a compression code for a third z may be predicted based on the compression codes for the first z and the second z, and so on. The compression codes generally represent different spatio-temporal chunks of a given video to be compressed. Each code $z_{t,c,w,h}$, representing a code indexed by time, channel, and horizontal and vertical position may be predicted based on a previous code, which may be a fixed and theoretically arbitrary ordering of codes. In some aspects, the codes may be generated by analyzing a given video file from start to finish and analyzing each frame in a raster scan order.

In some aspects, z may be represented as a four-dimensional tensor. The four dimensions of the tensor may include a time dimension, a channel dimension, and height and width spatial dimensions. In some embodiments, the channel dimensions may include different color channels (the red, green, and blue channels in various RGB color spaces, such as Adobe RGB, sRGB, NTSC, UHD, or Rec. 709 color spaces). In some aspects, the channels may refer to a number of channels of a wireless network (e.g., 64 channels, 128 channels, etc.).

Code model 404 may learn the probability distribution for an input code z using a probabilistic auto-regressive model. The probability distribution may be conditioned on its previous values and may be represented by the equation:

$$P(z) = \prod_{t=0}^{T}\prod_{c=0}^{C}\prod_{w=0}^{W}\prod_{h=0}^{H} p(z_{t,c,w,h} | z_{0:t,0:c,0:w,0:h})$$

where t is a time index for all time between the start of the video at t=0 to the end of the video at t=T, where c is a channel index for all channels C, where w is a width index for a total video frame width W, and where h is a height index for a total video frame height H.

The probability distribution P(z) may be predicted by a fully convolutional neural network of causal convolutions. In some aspects, the kernels of each layer of the convolutional network may be masked such that the convolutional network is aware of previous values $z_{0:t,0:c,0:w,0:h}$ and may not be aware of other values in calculating a probability distribution. In some aspects, a final layer of the convolutional network may include a softmax function that determines the probability of a code in latent space being applicable over an input value (e.g., a likelihood that a given code can be used to compress a given input). While training code model 404, the softmax function may use a one-hot vector, and while testing, code model 404 may select the code associated with the highest probability.

In some aspects, code model 404 may be implemented using four-dimensional convolutions (e.g., such that $$P(z) = \prod_{t=0}^{T}\prod_{c=0}^{C}\prod_{w=0}^{W}\prod_{h=0}^{H} p(z_{t,c,w,h} | z_{0:t,0:c,0:w,0:h}).$$

Using four-dimensional convolutions in this manner may be computationally expensive due, in part, to the number of parameters to be calculated. To accelerate generation of the probability distribution, a different factorization of dependencies may be used, as shown below:

$$P(z) \approx \prod_{t=0}^{T}\prod_{c=0}^{C}\prod_{w=0}^{W} \prod_{h=0}^{H} p(z_{t,c,w,h} | z_{t,0:c,0:w,0:h}, \varphi_{0:t-1,0:C,0:W,0:W}).$$

With this factorization, code model 404 is implemented as a three-dimensional convolutional model conditioned on time. The factorization may examine previous codes at a given time t and a conditioning signal φ associated with the codes up to time t. Conditioning signal φ may be obtained by passing the codes from the previous time steps (e.g., $z_{0:t-1,0:C,0:W,0:W}$) through a set of convolutional long short-term memory (LSTM) layers.

Arithmetic coder 406 uses the probability distribution P(z) generated by code model 404 and outputs a bitstream corresponding to a prediction of the code z. The prediction of code z may be represented as the code having a highest probability score in a probability distribution P(z) generated over a set of possible codes. In some aspects, arithmetic coder 406 may output a bitstream of variable length based on the accuracy of a prediction of code z and the actual code z generated by auto-encoder 401. For example, the bitstream may correspond to a short codeword if the prediction is accurate, whereas the bitstream may correspond to longer codewords as a magnitude of a difference between code z and the prediction of code z increases. The bitstream may be output by arithmetic coder 406 for storage in a compressed video file, transmission to a requesting device (e.g., as illustrated in FIG. 4, receiving device 420), and the like. Generally, the bitstream output by arithmetic coder 406 may losslessly encode z such that z may be accurately recovered during decompression processes applied on a compressed video file.

At receiving device 420, the bitstream generated by arithmetic coder 406 and transmitted from transmitting device 410 may be received by receiving device 420. Transmission between transmitting device 410 and receiving device 420 may occur via any of various suitable wired or wireless communication technologies. Communication between transmitting device 410 and receiving device 420 may be direct or may be performed through one or more network infrastructure components (e.g., base stations, relay stations, mobile stations, network hubs, etc.).

As illustrated, receiving device 420 may include an arithmetic decoder 426, a code model 424, and an auto-encoder 421. Auto-encoder 421 may include an encoder 422 and decoder 423 and may be trained using the same or a different training data set used to train auto-encoder 401 so that decoder 423, for a given input, can produce the same, or at least a similar, output as decoder 403. While auto-encoder 421 is illustrated as including an encoder 422, encoder 422 need not be used during the decoding process to obtain $\hat{x}$ (e.g., an approximation of an original video x compressed at transmitting device 410) from a code z received from transmitting device 410.

The received bitstream may be input into arithmetic decoder 426 to obtain one or more codes z from the bitstream. As illustrated, arithmetic decoder 426 may extract a decompressed code z based on a probability distribution P(z) generated by code model 424 over a set of possible codes and information associating each generated code z with a bitstream. More specifically, given a received portion of the bitstream and a probabilistic prediction of the next code z, arithmetic decoder 426 may produce a new code z as it was encoded by arithmetic coder 406 at transmitting device 410. Using the new code z, arithmetic decoder 426 may make a probabilistic prediction for a successive code z, read an additional part of the bitstream, and decode the successive code z until the entire received bitstream is decoded. The decompressed code z may be provided to decoder 423 in auto-encoder 421, which decompresses code z and outputs an approximation x̂ of video content x. The approximation x̂ of video content x at receiving device 420 may be recovered and displayed on a screen communicatively coupled to or integral with receiving device 420.

Figure 5:
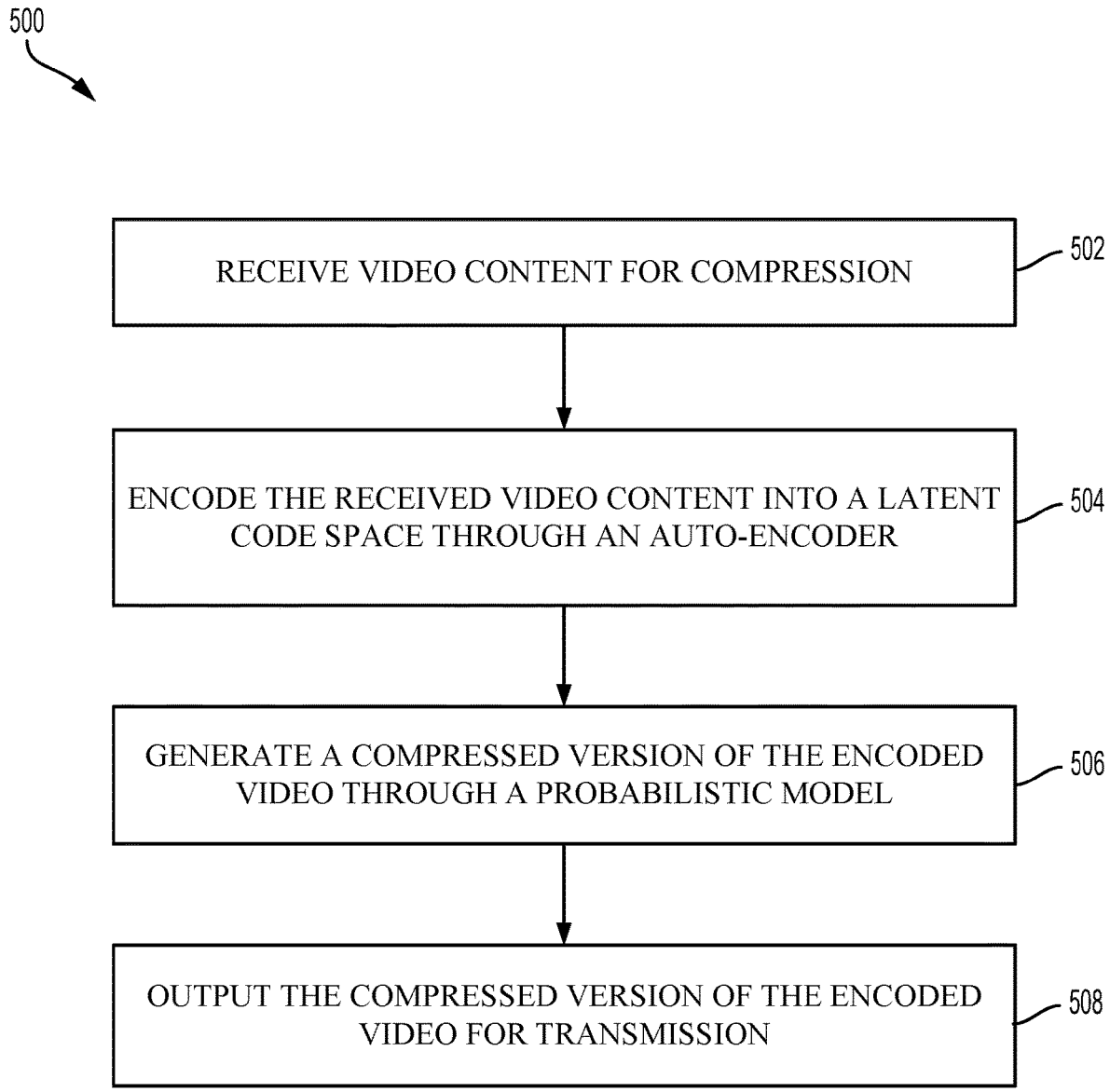
FIG. 5 illustrates example operations for compressing received video content through a compression pipeline including an auto-encoder and a probabilistic model, according to aspects of the present disclosure.

FIG. 5 illustrates example operations 500 for compressing video content in a deep neural network, according to aspects described herein. Operations 500 may be performed by a system with one or more processors (e.g., CPU, DSP, GPU, etc.) implementing the deep neural network. For example, the system may be transmitting device 410.

As illustrated, operations 500 begin at block 502, where the system receives video content for compression. The video content may, for example, include uncompressed video content comprising a number of frames of a given height and width and associated with a given frame rate.

At block 504, the system encodes the received video content into a latent code space through an auto-encoder. As discussed, the encoding of received, uncompressed video content x into a latent code space may result in generation of one or more codes z such that decoding of the one or more codes z results in an approximation x̂ of the uncompressed video x.

At block 506, the system generates a compressed version of the encoded video through a probabilistic model. As discussed, the compressed version of the encoded video may be generated based on a probability distribution of codes usable for compressing the encoded video z, where higher probability codes have shorter code words and lower probability codes have longer code words.

At block 508, the system outputs the compressed version of the encoded video for transmission. The compressed version may be output for transmission to the same or a different device with the system. For example, the compressed version may be output for a transmission to a storage device (e.g., local storage or remote storage), a remote service (e.g., a video hosting service), a requesting device (e.g., receiving device 420), or the like.

According to certain aspects, the auto-encoder is trained by receiving first video content, encoding the first video content into the latent code space, generating a reconstructed version of the first video content by decoding the encoded first video content; comparing the reconstructed version of the first video content to the received first video content, and adjusting the auto-encoder based on the comparing. For certain aspects, adjusting the auto-encoder involves performing a gradient descent.

According to certain aspects, the auto-encoder is configured to encode the received video content into the latent code space. Encoding of the received video content into the latent code space may be based on a three-dimensional filter. Dimensions of the three-dimensional filter may include height of a video frame, width of the video frame, and time of the video frame.

According to certain aspects, the trained probabilistic model includes an auto-regressive model of a probability distribution over four-dimensional tensors. The probability distribution generally illustrates a likelihood that different codes can be used to compress the encoded video content. For certain aspects, the probabilistic model generates data based on a four-dimensional tensor. In this case, dimensions of the four-dimensional tensor may include time, a channel, and spatial dimensions of the video content, for example. For certain aspects, the probability distribution is generated based on a factorization of dependencies. In this case, the factorization of dependencies may represent the probability distribution based on a code associated with a current time slice in the video content and a conditioning signal. The conditioning signal may, for example, include an output generated by a recurrent neural network for an input of codes associated with previous time slices in the video content other than the current time slice. For certain aspects, the recurrent neural network includes a set of convolutional long short-term memory (LSTM) layers.

Example Video Decompression Using Deep Generative Models

Figure 6:
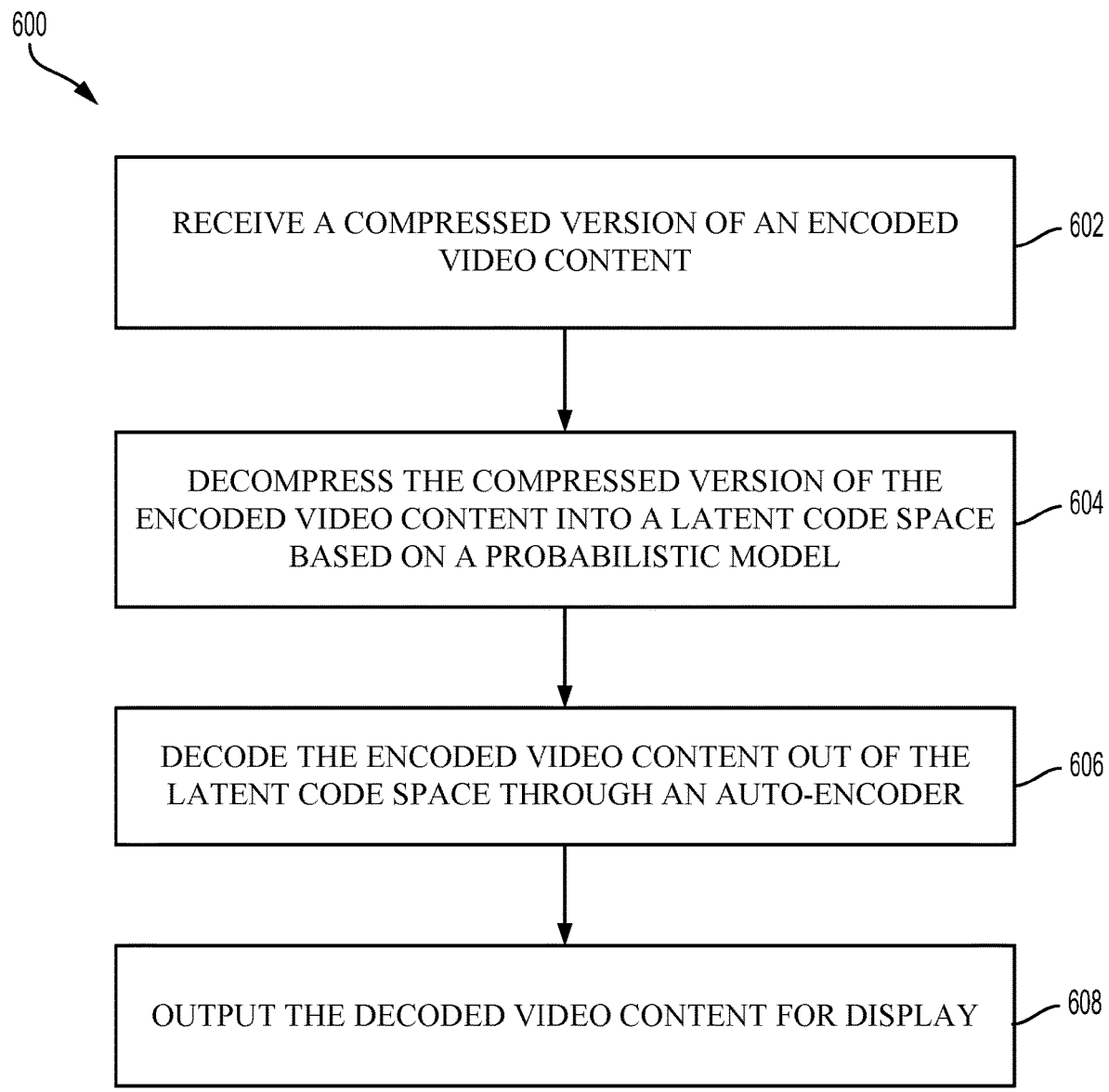
FIG. 6 illustrates example operations for decompressing encoded video, according to aspects of the present disclosure.

FIG. 6 illustrates example operations 600 for decompressing encoded video (e.g., a received bitstream) into video content in a deep neural network according to aspects described herein. Operations 600 may be performed by a system with one or more processors (e.g., CPU, DSP, GPU, etc.) implementing the deep neural network. For example, the system may be receiving device 420.

As illustrated, operations 600 begin at block 602, where the system receives a compressed version of an encoded video content (e.g., from a transmitting device). The compressed version of the encoded video content may be received, for example, as a bitstream including one or more code words corresponding to one or more codes z representative of a compressed video or portion thereof.

At block 604, the system generates a decompressed version of the encoded video content into a latent code space based on a probabilistic model. The system may identify one or more codes z corresponding to the received compressed version of the encoded video content based on a probability distribution of codes that may have been used to compress the encoded video. In some cases, the system may identify one or more codes based on a length of each code word, where higher probability codes have shorter code words and lower probability codes have longer code words.

At block 606, the system decodes the decompressed version of the encoded video content out of the latent code space using an auto-encoder. As discussed, the auto-encoder may be trained so that the decoding of the one or more codes z in the decompressed version of the encoded video results in an approximation x̂ representing uncompressed video x. Each code z may represent a portion of a latent code space from which the approximation x̂ representing uncompressed video x may be generated.

At block 608, the system outputs the decoded video content for playback. The system may output the decoded video content for playback on one or more display devices communicatively coupled to or integral with the system.

According to certain aspects, the auto-encoder is trained by receiving first video content; encoding the first video content into the latent code space; generating a reconstructed version of the first video content by decoding the encoded first video content; comparing the reconstructed version of the first video content to the received first video content; and adjusting the auto-encoder based on the comparing.

According to certain aspects, the auto-encoder is configured to decode the encoded video content out of the latent code space. Decoding of the received video content out of the latent code space may be based on a three-dimensional filter. Dimensions of the three-dimensional filter may include height of a video frame, width of the video frame, and time of the video frame.

According to certain aspects, the probabilistic model includes an auto-regressive model of a probability distribution over four-dimensional tensors. The probability distribution generally illustrates a likelihood that different codes can be used to decompress the encoded video content. For certain aspects, the probabilistic model generates data based on a four-dimensional tensor. In this case, dimensions of the four-dimensional tensor may include time, a channel, and spatial dimensions of the video content, for example. For certain aspects, the probability distribution is generated based on a factorization of dependencies. In this case, the factorization of dependencies may represent the probability distribution based on a code associated with a current time slice in the video content and a conditioning signal. For certain aspects, the conditioning signal includes an output generated by a recurrent neural network for an input of codes associated with previous time slices in the video content other than the current time slice. The recurrent neural network may include a set of convolutional long short-term memory (LSTM) layers.

Figure 7:
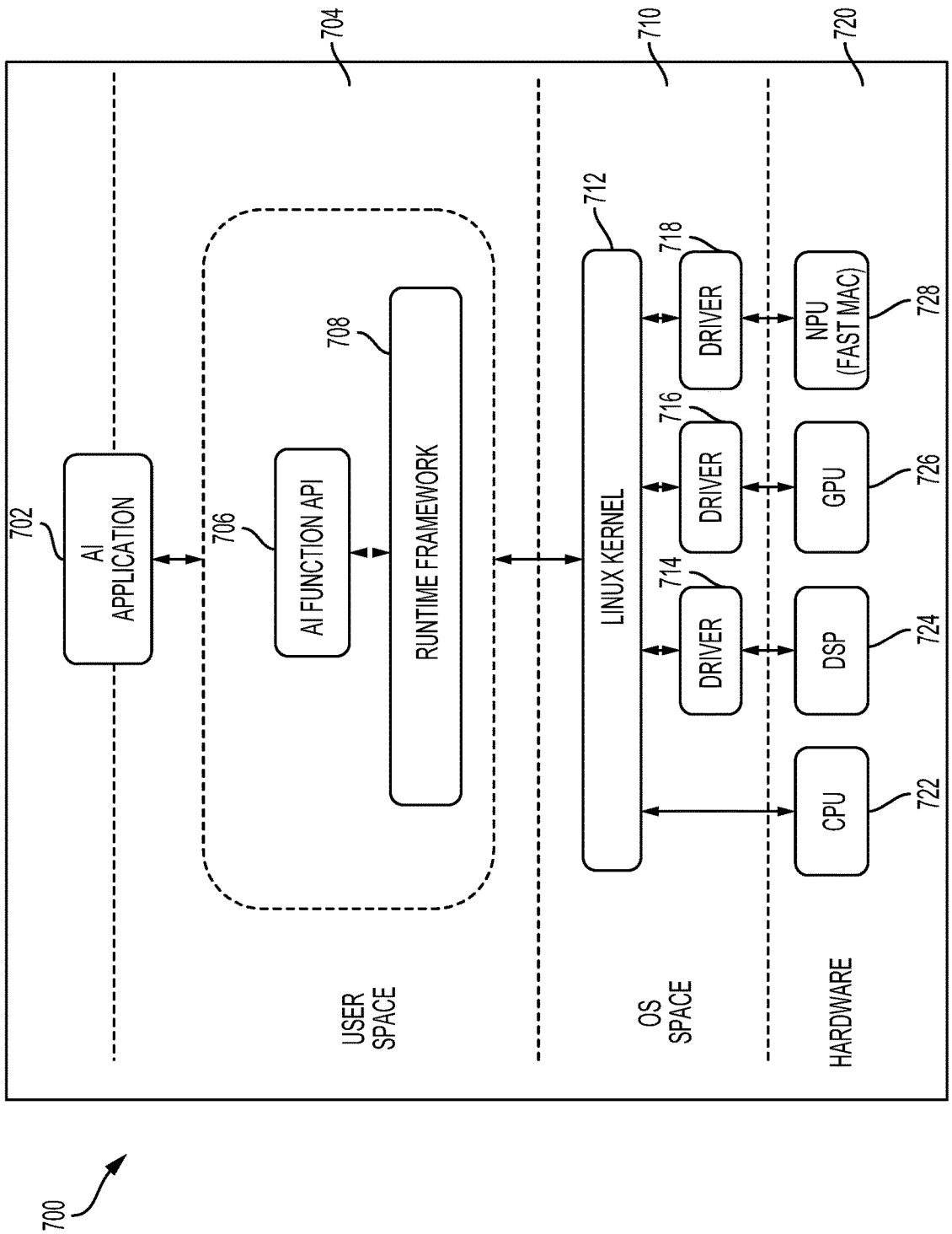
FIG. 7 shows a block diagram illustrating an exemplary software architecture for modularizing artificial intelligence (AI) functions, according to aspects of the present disclosure.

FIG. 7 is a block diagram illustrating an exemplary software architecture 700 that may modularize artificial intelligence (AI) functions. Using architecture 700, applications may be designed that may cause various processing blocks of an SOC 720 (for example a CPU 722, a DSP 724, a GPU 726, and/or an NPU 728) to support video compression and/or decompression using deep generative models, according to aspects of the present disclosure.

The AI application 702 may be configured to call functions defined in a user space 704 that may, for example, compress and/or decompress video signals (or encoded versions thereof) using deep generative models. The AI application 702 may, for example, configure a microphone and a camera differently depending on whether the recognized scene is an office, a lecture hall, a restaurant, or an outdoor setting such as a lake. The AI application 702 may make a request to compile program code associated with a library defined in an AI function application programming interface (API) 706. This request may ultimately rely on the output of a deep neural network configured to provide an inference response based on video and positioning data, for example.

A run-time engine 708, which may be compiled code of a runtime framework, may be further accessible to the AI application 702. The AI application 702 may cause the run-time engine, for example, to request an inference at a particular time interval or triggered by an event detected by the user interface of the application. When caused to provide an inference response, the run-time engine may in turn send a signal to an operating system in an operating system (OS) space 710, such as a Linux Kernel 712, running on the SOC 720. The operating system, in turn, may cause video compression and/or decompression using deep generative models to be performed on the CPU 722, the DSP 724, the GPU 726, the NPU 728, or some combination thereof. The CPU 722 may be accessed directly by the operating system, and other processing blocks may be accessed through a driver, such as a driver 714, 716, or 718 for, respectively, the DSP 724, the GPU 726, or the NPU 728. In the exemplary example, the deep neural network may be configured to run on a combination of processing blocks, such as the CPU 722, the DSP 724, and the GPU 726, or may be run on the NPU 728.

The various illustrative circuits described in connection with aspects described herein may be implemented in or with an integrated circuit (IC), such as a processor, a digital signal processor (DSP), an application-specific integrated circuit (ASIC), a field-programmable gate array (FPGA), or other programmable logic device. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for compressing video, comprising:
   receiving video content for compression;
   encoding, into a code in a latent code space, the video content through an auto-encoder implemented by a first artificial neural network, wherein the code in the latent code space represents a lossy encoding of the received video content such that decoding the code results in an approximation of the received video content;

generating a losslessly compressed version of the code in the latent space video content through a probabilistic model implemented by a second artificial neural network; and outputting the losslessly compressed version of the code in the latent space for transmission.

2. The method of claim 1, wherein the auto-encoder is trained by:
receiving first video content;
encoding the first video content into the latent code space;
generating a reconstructed version of the first video content by decoding the encoded first video content;
comparing the reconstructed version of the first video content to the received first video content; and
adjusting the auto-encoder based on the comparing.

3. The method of claim 2, wherein adjusting the auto-encoder comprises performing a gradient descent.

4. The method of claim 1, wherein the auto-encoder is configured to encode the video content into the code in the latent code space based on a three-dimensional filter, wherein dimensions of the three-dimensional filter comprise height of a video frame, width of the video frame, and time of the video frame.

5. The method of claim 1, wherein the probabilistic model comprises an auto-regressive model of a probability distribution over four-dimensional tensors, the probability distribution illustrating likelihood that different codes may be used to compress the encoded video content wherein the code in the latent code space is included among the different codes.

6. The method of claim 5, wherein the probabilistic model generates data based on a four-dimensional tensor, wherein dimensions of the four-dimensional tensor comprise time, a channel, and spatial dimensions of the video content.

7. The method of claim 5, wherein the probability distribution is generated based on a factorization of dependencies.

8. The method of claim 7, wherein the factorization of dependencies represents the probability distribution based on a second code associated with a current time slice in the video content and a conditioning signal.

9. The method of claim 8, wherein the conditioning signal comprises an output generated by a recurrent neural network for an input of previous codes in the latent code space associated with previous time slices in the video content other than the current time slice.

10. The method of claim 9, wherein the recurrent neural network comprises a set of convolutional long short-term memory (LSTM) layers.

11. A system for compressing video, comprising:
at least one processor configured to:
receive video content for compression;
encode, into a code in a latent code space, the video content through an auto-encoder implemented by a first artificial neural network configured to execute on the at least one processor, wherein the code in the latent code space represent a lossy encoding of the received video content such that decoding the code results in an approximation of the received video content;
generate a losslessly compressed version of the code in the latent code space through a probabilistic model implemented by a second artificial neural network configured to execute on the at least one processor; and
output the losslessly compressed version of the code in the latent code space for transmission; and
a memory coupled to the at least one processor.

12. The system of claim 11, wherein the at least one processor is configured to train the auto-encoder by:
receiving first video content;
encoding the first video content into the latent code space;
generating a reconstructed version of the first video content by decoding the encoded first video content;
comparing the reconstructed version of the first video content to the received first video content; and
adjusting the auto-encoder based on the comparing.

13. The system of claim 12, wherein adjusting the auto-encoder comprises performing a gradient descent.

14. The system of claim 11, wherein the auto-encoder is configured to encode the video content into the code in the latent code space based on a three-dimensional filter, wherein dimensions of the three-dimensional filter comprise height of a video frame, width of the video frame, and time of the video frame.

15. The system of claim 11, wherein the probabilistic model comprises an auto-regressive model of a probability distribution over four-dimensional tensors, the probability distribution illustrating a likelihoods that different codes may be used to compress the encoded video content wherein the code in the latent code space is included among the different codes.

16. The system of claim 15, wherein the second artificial neural network implementing the probabilistic model is configured to generate data based on a four-dimensional tensor, wherein dimensions of the four-dimensional tensor comprise time, a channel, and spatial dimensions of the video content.

17. The system of claim 15, wherein the probability distribution is generated based on a factorization of dependencies.

18. The system of claim 17, wherein the factorization of dependencies represents the probability distribution based on a second code associated with a current time slice in the video content and a conditioning signal.

19. The system of claim 18, wherein the second artificial neural network comprises a recurrent neural network executing on the at least one processor, wherein the conditioning signal comprises an output generated by the recurrent neural network for an input of previous codes in the latent code space associated with previous time slices in the video content other than the current time slice.

20. The system of claim 19, wherein the recurrent neural network comprises a set of convolutional long short-term memory (LSTM) layers.

21. A method for decompressing encoded video, comprising:
receiving losslessly compressed data representative of an encoded video content;
decompressing the losslessly compressed data representative of the encoded video content based on a probabilistic model implemented by a first artificial neural network into a code in a latent code space;
decoding the encoded video content from the code in the latent code space through an auto-encoder implemented by a second artificial neural network into an approximation of an original video content, wherein the encoded video content comprises lossily compressed data; and
outputting, for display, output video content based on the approximation.

22. The method of claim 21, wherein the auto-encoder is trained by:
receiving first video content;
encoding the first video content into the latent code space;

generating a reconstructed version of the first video content by decoding the encoded first video content;

comparing the reconstructed version of the first video content to the received first video content; and adjusting the auto-encoder based on the comparing.

23. The method of claim 21, wherein the auto-encoder is configured to decode the encoded video content from the code in the latent code space based on a three-dimensional filter, wherein dimensions of the three-dimensional filter comprise height of a video frame, width of the video frame, and time of the video frame.

24. The method of claim 21, wherein the probabilistic model comprises an auto-regressive model of a probability distribution over four-dimensional tensors, the probability distribution illustrating likelihoods that different codes may be used to decompress the encoded video content wherein the code in the latent code space is included among the different codes.

25. The method of claim 24, wherein the probabilistic model generates data based on a four-dimensional tensor, wherein dimensions of the four-dimensional tensor comprise time, a channel, and spatial dimensions of the video content.

26. The method of claim 25, wherein the probability distribution is generated based on a factorization of dependencies.

27. The method of claim 26, wherein the factorization of dependencies represents the probability distribution based on a second code in the latent code space associated with a current time slice in the video content and a conditioning signal.

28. The method of claim 27, wherein the conditioning signal comprises an output generated by a recurrent neural network for an input of previous codes in the latent code space associated with previous time slices in the video content other than the current time slice.

29. The method of claim 28, wherein the recurrent neural network comprises a set of convolutional long short-term memory (LSTM) layers.

30. A system for decompressing encoded video, comprising:

at least one processor configured to:

receive losslessly compressed data representative of an encoded video content;

decompress the losslessly compressed data representative of the encoded video content into a code in a latent code space based on a probabilistic model implemented by a first artificial neural network configured to execute on the at least one processor;

decode the encoded video content from the code in the latent code space through an auto-encoder implemented by a second artificial neural network configured to execute on the at least one processor into an approximation of an original video content, wherein the encoded video content comprises lossily compressed data output, for display, output video content based on the approximation; and a memory coupled to the at least one processor.

* * * * *